Figure 1:
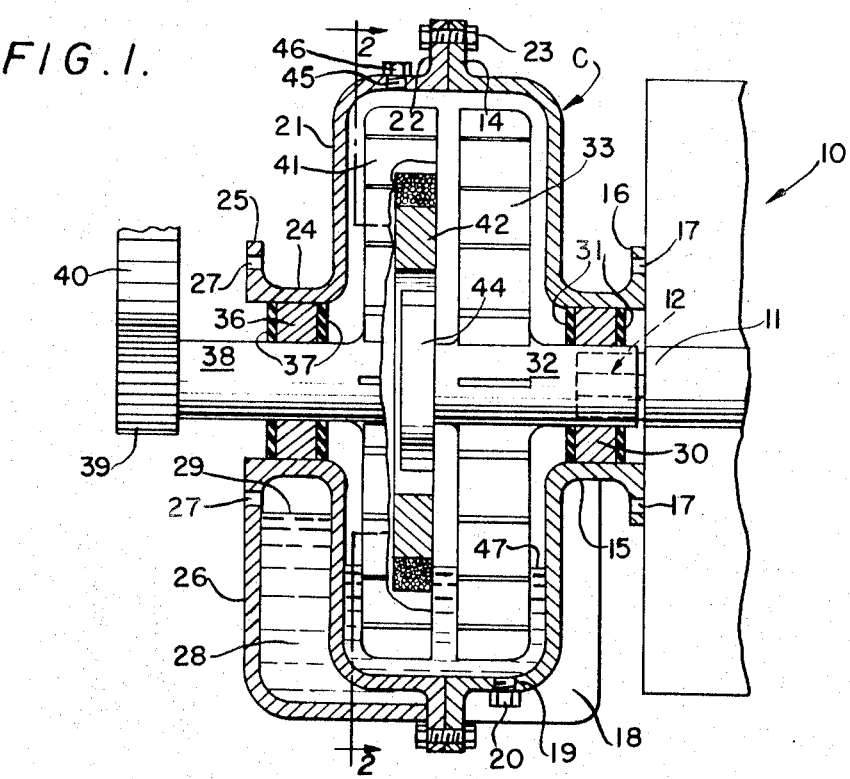

United States Patent

[11] 3,617,762

[72] Inventors: Kevin L. Price
22516 Wanamaker Pl., Detroit, Mich. 48223;
James C. Le Blanc, 39384 West Archer, Mt. Clemens, Mich. 48043
[21] Appl. No.: 66,733
[22] Filed: Aug. 25, 1970
[45] Patented: Nov. 2, 1971

[54] STARTER MOTOR GENERATOR COUPLING
8 Claims, 2 Drawing Figs.
[52] U.S. Cl. .................................................. 290/46
[51] Int. Cl. ............................................. H02k 23/52
[50] Field of Search .................................. 290/1 C, 22, 31, 46, DIG. 1, DIG. 9, DIG. 11

[56] References Cited
UNITED STATES PATENTS
2,504,833  4/1950  Hann ........................... 290/46 UX
2,703,847  3/1955  Kalikow ........................ 290/46

Primary Examiner—T. E. Lynch
Assistant Examiner—W. E. Duncanson, Jr.
Attorney—Schellin and Hoffman ABSTRACT: A starter motor having an armature shaft that is connected to the flywheel of an internal combustion engine by mechanical driving connections to drive the flywheel from the motor. However, when the motor is to be driven from the engine this mechanical drive is disabled and a fluid coupling is rendered effective to convert the motor to a generator.

PATENTED NOV 2 1971 3,617,762

INVENTORS
KEVIN L. PRICE &
JAMES C. LEBLANC

BY Schellin & Hoffman
ATTORNEYS

STARTER MOTOR GENERATOR COUPLING

The present invention relates to the starter motor of a conventional internal combustion engine such as is normally included in a motor vehicle and is concerned primarily with the driving connections between the armature shaft of the motor and the flywheel of the engine whereby the shaft may be driven from the flywheel to constitute the motor a generator.

BACKGROUND OF THE INVENTION

A starter motor is included in just about every motor vehicle to start the internal combustion engine thereof. The engine and vehicle also include many electrical devices which are run from the battery of the vehicle. A generator is normally provided to charge the battery and the generator is operated by the engine.

Due to the fact that every electric motor may also be operated as a generator, depending on whether power is taken from the armature shaft or delivered thereto it has long been recognized that the motor may be converted to a generator to charge the car battery. However, all of the known arrangements provided for this purpose have included some form of mechanical drive from the engine flywheel to the armature shaft.

Due to the need of providing a proper and often variable gear ratio in this drive the devices now available are extremely complex and, aside from the difficulties attending installation are prone to become out of order. For this reason they have met with little if any public acceptance.

OBJECTS OF THE INVENTION

With the foregoing conditions in mind the present invention has in view the following objects:

1. To provide, in the combination of an internal combustion engine including a flywheel and a starter motor including an armature shaft, a fluid coupling which is ineffective when the shaft drives the flywheel, but which is rendered effective when the flywheel drives the shaft.
2. To provide, in a combination of the type noted, a fluid coupling which automatically becomes effective when the flywheel achieves a predetermined speed at which time the mechanical drive from the shaft to the flywheel is disabled.
3. To provide, in a combination of the type aforesaid a fluid coupling which may be adjusted to vary the gear ratio provided thereby by varying the quantity of fluid medium in the coupling.
4. To provide a combination of the kind described which may readily be installed in a motor vehicle; and
5. To provide, in a combination of the type noted, means for cooling the fluid coupling.

Various other more detailed objects and advantages of the invention such as arise in connection with carrying out the above noted ideas in a practical embodiment will in part become apparent and in part be hereinafter stated as the description of the invention proceeds.

SUMMARY OF THE INVENTION

The foregoing objectives are achieved by providing a unit included in a casing which is adapted for installation between the starter motor and the internal combustion engine of a motor vehicle. This unit comprises a stub shaft drivably carrying a turbine element and having means at one end for drivably connecting it to one end of the armature shaft of the motor and an element of an overrunning clutch at the other end. A second stub shaft is journaled in the casing and carries at its inner end a complemental element of the overrunning clutch and at its outer end a pinion that meshes with a gear on the engine flywheel. Intermediate its ends a second turbine element is drivably mounted on the second stub shaft and cooperates with the first turbine element in establishing the drive from the flywheel to the armature shaft.

Provision is made for introducing a fluid medium into the casing and draining it therefrom. Cooling devices such as a jacket for a liquid cooling medium which is attached to the exterior of the casing or fins formed on the casing are optionally utilized.

Figure 2:
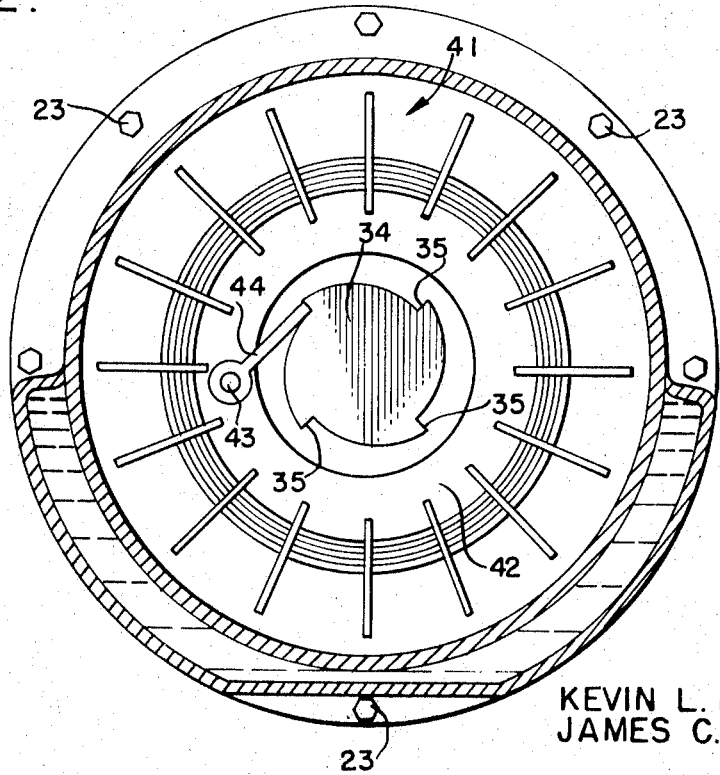

For a full and more complete understanding of the invention, reference may be had to the following description and accompanying drawing wherein:

FIG. 1 is an axial section through the casing and unit included therein of this invention; and FIG. 2 is a transverse section taken about on the plane of the line 2-2 of FIG. 1.

Referring now to the drawing wherein like reference characters denote corresponding parts a starter motor is represented at 10. Motor 10 includes an armature shaft 11 one end of which is formed with elements of a spline connection as indicated at 12.

A casing is referred to generally as C. It comprises a casing part 13 having an outstanding flange 14, and a reduced tubular portion 15 terminating in an anchoring flange 16. The latter is formed with openings 17 which accommodate bolts (not illustrated) which anchor casing C on the frame of the starter motor. Cooling fins, one of which is shown at 18 may be formed on the exterior of casing part 13. The latter is also formed with a drain aperture 19 that is normally closed by a threaded plug 20.

A second casing part 21 has an outstanding flange 22 that is clamped to flange 14 of casing part 13 by bolts 23. Casing part 21 has a reduced tubular portion 24 terminating at its free end in an upper flange 25 and a lower jacket wall 26. Flange 25 and wall 26 are formed with openings 27 which accommodate bolts (not illustrated) which anchor casing C to structure of the vehicle in which the unit is installed.

Jacket wall 26 is spaced from the adjacent portion of casing part 21 and is continued over the lower portion of the latter.

Wall 26 and casing part 21 define a chamber 28 which contains a cooling medium represented at 29.

Mounted in tubular portion 15 of casing part 13 is a bearing 30 on each face of which is a seal 31. A first stub shaft 32 is journaled in bearing 30 and its outer end is formed with elements of a spline connection which are complemental to spline elements 12. Drivably mounted on shaft 30 is a turbine element 33. A ratchet 34 presenting teeth or shoulders 35 (FIG. 2) is carried at the inner end of shaft 30.

A bearing 36 is positioned in tubular portion 24 of casing part 21 with a seal 37 on each face thereof. A second stub shaft 38 is journaled in bearing 36 and drivably carries a pinion 39 on its outer end. Pinion 39 meshes with a gear 40 that is carried by the flywheel of the engine of the vehicle in which the unit is installed. A second turbine element 41 is drivably mounted on stub shaft 38. Received within turbine element 41 and drivably mounted on stub shaft 38 is a ring 42. Pivoted on ring 42 as indicated at 43 is a pawl 44 which cooperates with shoulders 35 of ratchet 34 when the drive is from armature shaft 11 to the flywheel.

Casing part 21 is formed with an aperture 45 at its top through which a fluid medium is introduced into casing C. Aperture 45 is normally closed by a screw plug 46. The fluid medium is represented at 47.

OPERATION

While the mode of operation of the subject unit is believed to be obvious from the illustrations of the drawing and description of parts set forth above it may be briefly outlined as follows:

It is first noted that the ignition switch of the vehicle which is key operated will include a switch that causes current to flow from the battery to the starter motor when the latter is energized. With the motor 10 operating as a motor from the battery armature shaft 11 drives stub shaft 32 through the spline connection 12. When this occurs shoulder 35 of ratchet 34 engages pawl 44 to drive stub shaft 38 and pinion 39. As the latter meshes with gear 40 the flywheel is rotated to start the engine.

After the engine is started the r.p.m. of the flywheel will exceed those of shaft 11. Under this condition pawl 44 will override shoulders 35 and the mechanical drive to the flywheel is discontinued. At this point turbine element 41 is rendered effective to drive turbine element 33 with the power being transmitted by fluid medium 47. Turbine element 33 now drives armature shaft 11 through stub shaft 32 and spline connection 12. Thus motor 10 is now constituted a generator which charges the car battery.

The subject unit affords the following advantages:
1. All danger of reengaging the starter motor with the flywheel after the engine is started is eliminated.
2. The necessity for a large number of parts is obviated. Thus there is no need for an alternate generator belt, brackets and mounting structure for the generator.
3. The gear ratio provided by the fluid coupling may be adjusted by varying the amount of fluid medium 47 in casing C.
4. The changeover from the drive to the flywheel from the armature shaft to the drive from the flywheel to the armature shaft is fully automatic.
5. A device for reversing the direction of voltage to or from the battery may be included in a voltage regulator.

While a preferred specific embodiment of the invention is hereinbefore set forth, it is to be clearly understood that the invention is not to be limited to the exact constructions, mechanisms and devices illustrated and described because various modifications of these details may be provided in putting the invention into practice.

What is claimed is:
1. In a motor vehicle including an internal combustion engine having a flywheel with a gear thereon and a starter motor including an armature shaft, a unit providing driving connections between said shaft and flywheel comprising:
   a. a casing including means for mounting the casing in said vehicle,
   b. a first stub shaft journaled in said casing and drivably connected to said armature shaft,
   c. an element of an overrunning clutch within said casing and drivably mounted on said shaft,
   d. a first turbine element drivably mounted on said shaft within said casing,
   e. a second stub shaft journaled in said casing and having a pinion on its outer end in driving relation to the flywheel,
   f. an element of an overrunning clutch on the inner end of said second stub shaft and cooperating with clutch element on the first stub shaft,
   g. a second turbine element drivably mounted on said second stub shaft within the casing in confronting relation to said first turbine element, and
   h. a fluid medium in said casing cooperating with said turbine elements, whereby the drive from the armature shaft to the flywheel is mechanical and the drive from the flywheel to the armature shaft is through the fluid coupling provided by the turbine elements and fluid medium.

2. The unit of claim 1 in which the elements of the overrunning clutch take the form of a ratchet on one stub shaft and a pawl on the other stub shaft.

3. The unit of claim 1 together with a cooling device carried by the casing.

4. The unit of claim 3 in which the cooling device takes the form of a jacket on the casing and a cooling medium therein.

5. The unit of claim 3 in which the cooling device takes the form of fins on the exterior of the casing.

6. The unit of claim 1 in which the casing is formed with an aperture for introducing a fluid medium thereinto and a drainage aperture.

7. The unit of claim 1 in which the casing comprises two parts clamped together with each part having a tubular portion, said stub shafts being journaled in said tubular portions.

8. The unit of claim 1 in which the armature shaft is joined to the first stub shaft by a spline connection.

* * * * *